April 27, 1965     HANNS-DIETER PASCHKE     3,180,561
NON-JAMMING APEX SEAL

Filed May 28, 1962                                3 Sheets-Sheet 1

INVENTOR.
HANNS-DIETER PASCHKE
BY
Thomas W. Kennedy
ATTORNEY

April 27, 1965  HANNS-DIETER PASCHKE  3,180,561
NON-JAMMING APEX SEAL

Filed May 28, 1962  3 Sheets-Sheet 2

INVENTOR.
HANNS-DIETER PASCHKE
BY
Thomas W. Kennedy
ATTORNEY

April 27, 1965 HANNS-DIETER PASCHKE 3,180,561
NON-JAMMING APEX SEAL

Filed May 28, 1962 3 Sheets-Sheet 3

Fig. 1A – PRIOR ART

INVENTOR.
HANNS-DIETER PASCHKE
BY
Thomas W. Kennedy
ATTORNEY

United States Patent Office 3,180,561
Patented Apr. 27, 1965

3,180,561
NON-JAMMING APEX SEAL
Hanns-Dieter Paschke, Neckarsulm, Wurttemberg, Germany, assignor to NSU Motorenwerke Aktiengesellschaft, Neckarsulm, and Wankel G.m.b.H., Lindau (Bodensee), Germany, both corporations of Germany
Filed May 28, 1962, Ser. No. 198,202
Claims priority, application Germany, June 7, 1961, N 20,158
7 Claims. (Cl. 230—145)

The present invention relates broadly to the art of rotary mechanisms and is particularly directed to sealing means for such rotary mechanisms.

The invention is particularly useful in connection with rotary mechanisms similar to that disclosed in United States Patent Number 2,988,065, although as will become apparent, this invention is not limited to this specific type of rotary mechanism. In the following description the invention is described in relation to an internal combustion engine but the invention is also suitable for fluid pumps and fluid motors.

A rotary engine as disclosed in said patent comprises an outer body or housing having a cavity therein and an inner body or rotor disposed therein rotatable relative to the outer body, about an axis laterally spaced from, but parallel to the axis of said cavity. The inner body is journaled on an eccentric portion of a shaft which is coaxial with the outer body and journaled in bearings carried by the outer body end walls. The outer body has axially-spaced end walls and a peripheral wall interconnecting the end walls to form said cavity; the inner surfaces of the cavity peripheral wall having a multi-lobed profile which preferably is basically an epitrochoid. The inner body or rotor has end faces disposed adjacent to said outer body end walls for sealing cooperation, therewith and has a peripheral surface with a plurality of circumferentially-spaced apex portions, each carrying a radially-movable seal or seal means for sealing engagement with the multi-lobed inner surface of the outer body peripheral wall to form a plurality of working chambers between the two bodies which vary in volume upon relative rotation of the two bodies. Each apex seal of the inner body runs axially, separating the adjacent working chambers, and is received within an outwardly-facing groove running axially from one end face to the other of the inner body at its associated apex portion on the inner body.

Prior combustion engines of this type have had apex seals which were rectangular in elevation view, with square-cut ends. The end faces of these apex seal strips are in sealing engagement with the flat inner surfaces of the housing end walls for sealing the working chambers. This requires that the apex seal strips fit closely between the end walls thereby preventing gaps, or at least reducing the size of gaps at the end faces of the seal strips, in order to prevent leakage of gases around the seal strips and between the working chambers. However, the seal strips are subject to slight random tilting movements in a radial plane parallel to the axis of the outer body during operation of the device, and the end walls tend to clamp or jam the strips making them radially immovable, and thus unworkable for sealing, if the strips are tilted during operation from their axially-parallel position, particularly as caused by surface irregularities on the peripheral-wall inner surface. An apex strip can also be tilted by other thermal or elastic distortions in the housing and other engine parts. Accordingly, the aforementioned prior art form of tightly-fitted apex strips may lead to jamming, poor sealing and scarring of cooperating surfaces; and have been found to be costly to manufacture due to their tight tolerances.

An object of the present invention comprises the provision of a rotary combustion engine in which a novel apex seal arrangement for the working chambers is provided to maintain continuous and improved sealing during engine operation.

Specifically, instead of providing apex seals whose projected length or axial extent increases as it is tilted lengthwise, that is in the radial plane this invention provides apex seals, each comprising a strip with pointed or rounded ends, whose axial extent either decreases, or at least does not increase, as the seal strip is tilted. The ends of such an improved apex seal strip do not interfere with the housing end walls if the seal strip should tilt, so that the end walls do not jam the strip. Thus, this strip remains always radially-movable and workable, even when tilted during engine operation, thereby continually maintaining good sealing of the working chambers.

Another object of the invention is to provide an improved sealing arrangement of the working chambers comprising the aforementioned apex seals in combination with intermediate seal elements.

The invention also provides apex seals, each comprising a single rectangular seal assembly with square-out ends composed of a seal strip and supplementary pieces fitted together, whereby the seal strip does not increase in length when titled lengthwise. Furthermore, it is an object of this form of apex seal that, when the problem of tilting occurs, the surfaces of the strip adjoining the end walls still remain substantially in sealing contact, but not in immovable interference with their adjacent housing end walls, whereby good sealing engagement is assured not only at the outer edges, but also at the end faces of the apex seals.

This invention also provides ease and economy in manufacture of the sealing means for the working chambers by avoiding a close fit, with accompanying tight tolerances, between the apex seals and their adjoining parts.

Other objects of the invention will become apparent upon reading the annexed detail description in connection with the drawings in which:

FIG. 1A shows an apex seal of the prior art tilted in the radial plane, causing jamming and damage.

Figure 1:
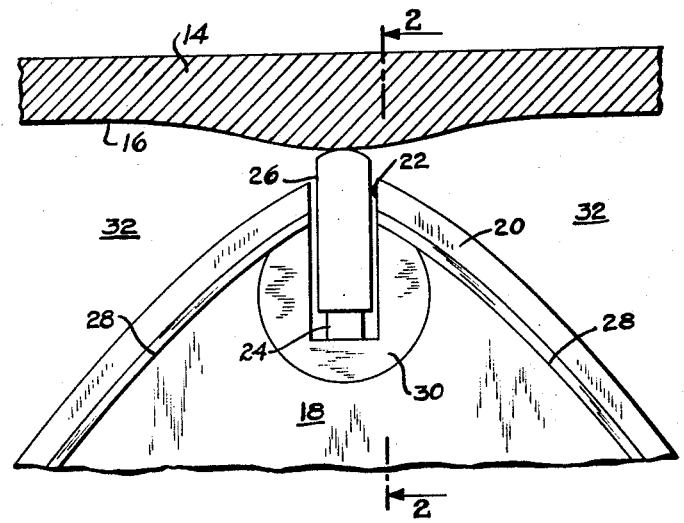
FIGURE 1 is a partial, end elevation view of a rotor apex portion and sealing means of a rotary combustion engine, as taken along line 1—1 of FIGURE 2.

Referring to the drawings, the housing of a rotary combustion engine comprises spaced end walls 10 and 12; and a peripheral wall 14 disposed between and interconnecting said end walls to form a cavity therebetween. The inner surface 16 of the peripheral wall 14 preferably has a multi-lobed profile in cross-section which is basically an epitrochoid.

Inside and eccentric to the housing is disposed an inner body or rotor 18, having a plurality of circumferentially-spaced apex portions 20 about its outer periphery. Each of said apex portions 20 has radially-movable apex seal means 26 received within a single outwardly-facing groove 22 extending from one end face to the other of the rotor 18 and urged radially outward, by spring means 24 and by gas pressure from one of the adjacent working chambers 32, into sealing engagement with the peripheral wall inner surface 16. The inner body 18 also has end faces having end-face seal means 28 and intermediate seal elements 30 disposed in sealing engagement with the end walls 10 or 12 to form a plurality of working chambers 32 which vary in volume upon rotation of the inner body 18 relative to the stationary outer body.

The bottom of each apex groove 22 has an enlarged cylindrical portion at each end of the groove, and an axially-movable intermediate seal element 30 is slidably fitted within such cylindrical portion and urged axially against the end wall 10 or 12 by gas pressure. Each end of each apex seal means 26 is in sealing cooperation with an intermediate seal element 30. Between the intermediate seal elements 30, disposed at the rotor apex portions 20 on each end face of the rotor 18 adjacent to the rotor periphery, and associated with a working chamber 32, are end face seal strips 28, each of which extends from one intermediate seal element 30 to an adjacent element 30.

During rotation of the inner body 18, the apex seal means 26 slide continuously along with their contact edges 34 in bearing against the inner surface 16 of the peripheral wall 14, and the intermediate seal elements 30 and end face seal strips 28 slide continuously along the flat inner surfaces of the end walls 10 and 12.

The engine so far described is substantially similar to the engine disclosed in the aforementioned United States Patent Number 2,988,065 and for additional description reference is made to said patent. The seal arrangement so far described is substantially similar to the seal arrangement disclosed in U.S. Patent No. 3,033,180.

FIG. 1A shows an apex seal of the prior art, tilted in the radial plane about an axis normal to the side face of the seal. The diagonal dimension of such a seal is greater than its normal untilted axial extent; hence, the diagonal dimension is too large for the available space between the end walls, and the corners of the seal dig into the end walls, causing scoring of the walls and jamming of the seal therebetween. The amount of tilt is greatly exaggerated in the drawing for clarity of illustration.

Figure 4:
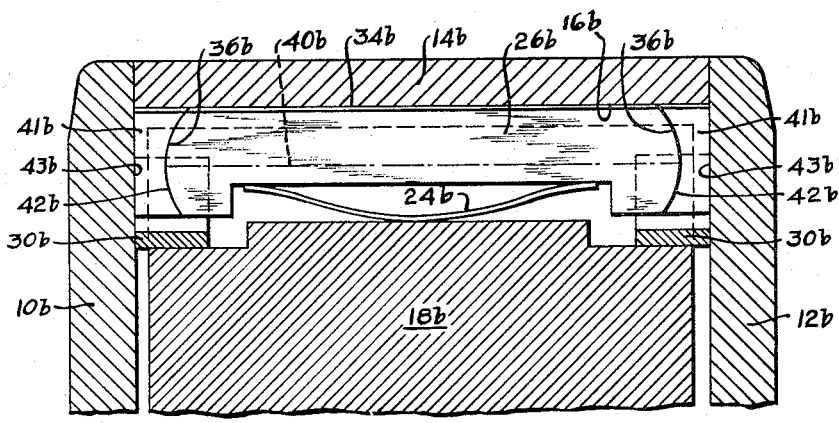
FIGURE 4 is another view similar to FIGURE 2, showing an additional form of apex seal in accordance with the invention.
Figure 5:
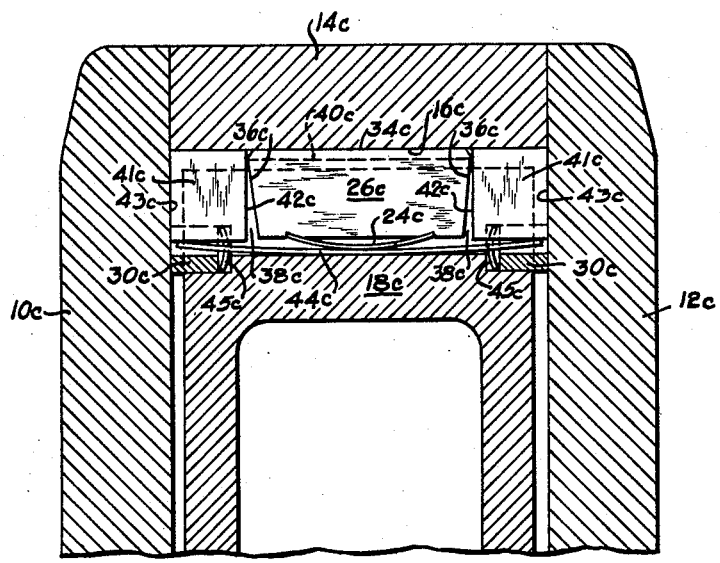
FIGURE 5 is another view similar to FIGURE 2, showing an additional form of apex seal.
Figure 6:
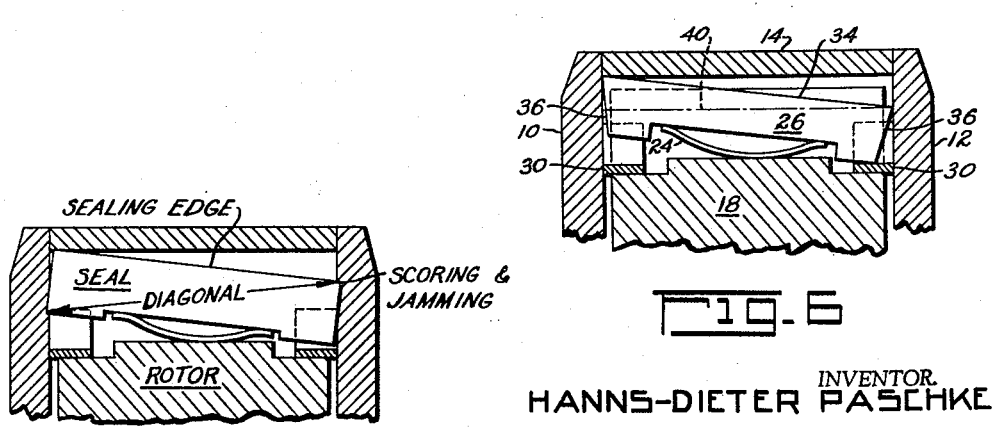
FIG. 6 is a view similar to FIG. 2, showing an apex seal according to the invention, as it may tilt in the radial plane during operation, without damage.

According to the invention, each apex seal strip 26, 26a, 26b, and 26c is illustrated in four embodiments in FIGURES 2, 3, 4, and 5. In each of these forms of apex seal strips, each seal strip is normally positioned so that it is parallel to the rotor axis; and it is constructed so that the length or axial extent of the seal strip as projected on the rotor axis does not increase if the seal strip should tilt in the radial plane, that is about a transverse axis normal to the side faces of the strip. In other words, the seal strip has no dimension greater than its axial extent in normal untilted position. Hence, tilting of these apex seal strips about an axis normal to their side faces will not cause them to jam between the end walls 10 and 12, as shown in FIG. 6.

Figure 2:
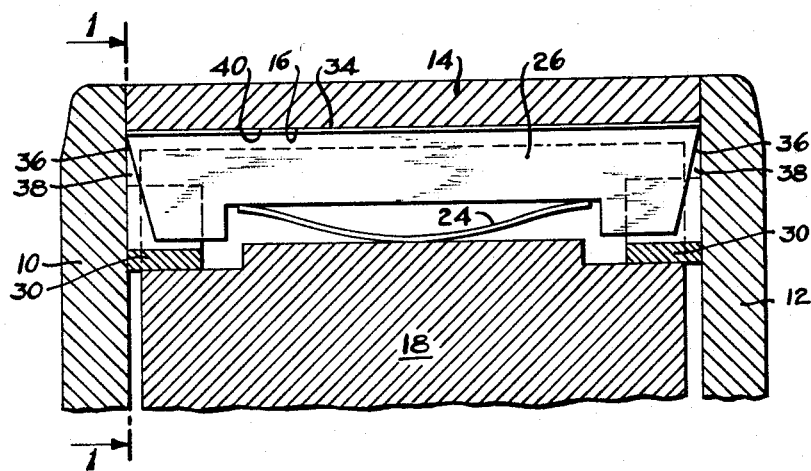
FIGURE 2 is a partial, longitudinal, sectional view through a rotor apex portion and groove showing sealing means in accordance with the invention, as taken along line 2—2 of FIGURE 1.

In the embodiment of the apex seal strips 26 illustrated in FIGURE 2, each strip is constructed so that its length is a maximum along its outer edge 34, and its two end faces 36 converge toward each other in a radially inward direction, that is each end face 36 slopes away from its adjacent end wall 10 or 12 in a radially inward direction. Therefore the contact between each seal end face and its cooperating housing end wall is basically a line contact.

Next to the strip 26 and at each end of each apex groove 22, is an intermediate seal element 30 in sealing engagement with the adjacent end of the apex seal strip 26. This arrangement results in a small triangular gap 38 at each end face 36 of the apex seal strip 26, with the gap 38 having a border made up of the strip end face 36, the flat surface of the adjacent end wall 10 or 12 and by the radially-outward surface of the intermediate seal element 30. To prevent leakage and keep the gap 38 as small as possible the intermediate seal element 30 should be preferably placed as far radially-outward as possible on the rotor 18.

To describe the actual conditions in an engine, it should be noted that the gaps 38 are enlarged for the purpose of illustration in all figures of the drawing. In actual scale in an engine, the size of each gap is about a fraction of a millimeter or about ten thousandths of an inch (0.010″) in average width.

Each end face 36 of the apex seal strip 26 has a side elevational profile such that no point thereon projects beyond an arc of a circle whose center lies on its longest axial extent 34, between the mid-point of said extent and the opposite end; and the profile of the end face 36, as illustrated in FIGURE 2, is a chord to said arc. However, where the seal strip 26 engages the intermediate seal element 30, the profile may taper radially inwardly and sharply away from said arc as explained hereafter.

This shape of the strip ends assures that the apex seal strips 26 avoid clamping and jamming when tilted, provide good sealing on all edges, maintain small end face gaps, prevent leakage and are easy to manufacture.

Figure 3:
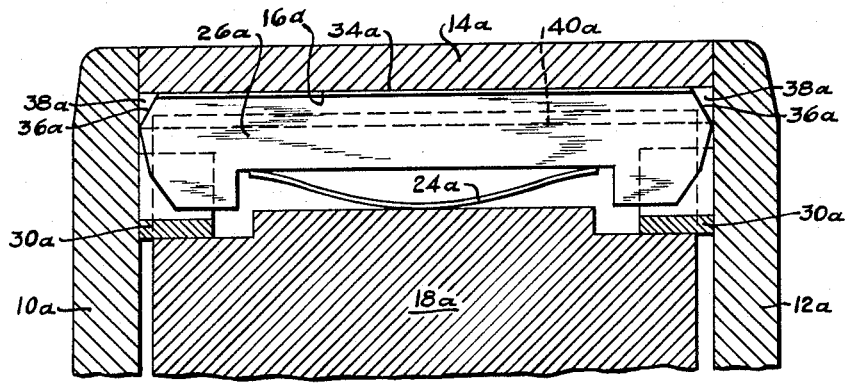
FIGURE 3 is a view similar to FIGURE 2, showing another form of apex seal in accordance with the invention.

Another embodiment of apex seal means in accordance with the invention is shown in FIGURE 3. For ease of understanding, the parts of FIGURE 3 corresponding to the parts of FIGURES 1 and 2 have been designated by the same reference numerals but with a suffix "a" added thereto.

In order to further reduce possible leakage at the end faces 36a and reduce the area of the triangular gaps 38a, another embodiment of apex seal strip 26a, as shown in FIGURE 3, has its maximum axial extent 40a in a position parallel to the outer edge 34a, but displaced radially inwardly a distance equal to a fraction of its groove depth or about halfway between the peripheral-wall inner surface 16a and the outer surface of the intermediate seal element 30a.

This kind of a pointed end, at each end face 36a of the apex seal strip 26a forms two triangular gaps 38a at each end face, as shown in FIGURE 3, having a substantially smaller total cross-sectional area than the single triangular gap 38 of the aforementioned strip 26 as shown in FIGURE 2. This form of apex seal strip 26a also provides good sealing in both the axially-parallel and tilted positions of the strip, and avoids jamming of the strip 26a.

To prevent jamming of the apex seal strip 26a by the end walls 10a and 12a, it is necessary, as with the aforementioned strip 26, that each end face 36a of the strip 26a be constructed so that said end face 36a does not project beyond an arc of a circle, having its center on its maximum dimension line 40a between the mid-point of said line and the opposite end of the seal strip 26a.

When the apex seal strip 26a is combined with intermediate seal elements 30a, and thereby provides a sealing system for the working chambers 32a, then, only the part of the profile of the end face 36a, which is radially outward of the intermediate seal elements 30a, need form chords to the aforementioned circular arc. The portion of each end 36a, received within the adjacent intermediate seal element 30a, can be even more inclined as illustrated in FIGURE 3, since the intermediate seal element 30a provides the required sealing with the end walls 10a and 12a in this region. As mentioned previously, this was also true of the strip 26 illustrated in FIGURE 2.

In order to hold the gaps 38a as small as possible, it is preferable that the intermediate seal elements 30a are again placed as far radially outwardly as possible. This substantially reduces possible leakage at the end faces 36a, as the inner of each pair of gaps 38a is thereby reduced in size.

An additional embodiment of novel apex seal strip 26b is shown in FIGURE 4. For ease of understanding, the parts of FIGURE 4 corresponding to the parts of FIG- URES 1 and 2 have been designated by the same reference numerals but with a suffix "b" added thereto. In accordance with the invention, the end faces 36b are each defined by a profile forming a convex circular arc. Each convex curved end 36b of a seal strip 26b has sealing engagement with a complementary concave end face of a supplementary seal piece 41b and with basically arcuate sliding surface contact, more specifically circular sliding surface contact, under conditions of tilting in the radial plane. The other end of each supplementary seal piece 41b sealingly engages the adjacent end wall 10b or 12b. The projected length of each apex seal strip 26b, between the supplementary pieces 41b, remains unchanged when it is tilted, and is independent of the angular position of the apex seal strip 26b. This arrangement of FIGURE 4, therefore, also provides good sealing when the apex seal strip 26b is both in an axially-parallel position and in a tilted position.

As illustrated, the convex profiles of the end faces 36b of each strip 26b, and the corresponding concave sides 42b of the supplementary pieces 41b, are circular arcs, whose common centerpoint lies on the longitudinal centerline of symmetry 40b and at the mid-point of the length of the strip 26b. This construction of the joint minimizes leakage, and allows tilting of the strip without jamming.

Obviously in FIGURE 4 in lieu of the curved complementary surfaces between the apex seal strip 26b and the supplementary seal pieces 41b, the concave curved ends of the supplementary pieces 41b could be made flat and the convex curved ends of the apex seal strip could be pointed, for example in FIGURE 3. Such a modification is shown in FIGURE 5. The parts of FIGURE 5 corresponding to the parts of FIGURES 1 and 2 have been designated by the same reference numerals but with a suffix "c" added thereto.

In FIGURE 5, each end face 36c of the apex seal strip 26c is pointed and slopes away from the flat end face 42c of an adjoining supplementary piece 41c, which is disposed between the strip and face 36c and the end wall 10c or 12c. The supplementary piece 41c is also in sealing engagement with its adjacent end wall 10c or 12c along its other flat end face 43c. Hence, the projected length of the seal strip 26c between the supplementary end pieces 41c does not increase when tilted.

A separate spring means 44c urges the supplementary pieces 41c radially outward in sealing engagement with the peripheral wall inner surface 16c, in addition to the usual spring means 24c for urging the apex seal strip 26c radially outward in sealing engagement with the inner surface 16c along the strip outer edge 34c. Thus, each part 41c or 26c of the apex seal means can be deflected inwardly without affecting the other two parts; and the middle part or seal strip 26c can be tilted without jamming.

In FIGURE 5, the apex seal strip 26c has its maximum axial extent 40c in a position parallel to its outer edge 34c, but displaced radially inwardly about halfway between the peripheral wall inner surface 16c and the radially outward tip of the apex portion. The construction of the pointed ends would be similar to that of the strip 26a of FIGURE 3 so that the strip 26c is capable of tilting without jamming. In addition, the gaps 38c are mostly covered by the groove side walls, thus reducing leakage.

Further, the intermediate seal element 30c, sealingly engaging the supplementary pieces 41c, need not be disposed to reduce the gap size as shown in FIGURE 3, but can be moved radially inwardly, thus, easing the manufacturing of the circular groove receiving the intermediate seal element 30c. The intermediate seal element 30c is urged in bearing against the end walls 10c or 12c by a spring 45c, which may similarly be used with the forms shown in FIGURES 1 to 4.

The improved apex seal strips of the invention obviously are not limited to a cross-sectional shape as shown in FIGURE 1.

The various improvements of the invention provide improved sealing during engine operation, reduce the manufacturing cost of the seals and their cooperating parts, reduce maintenance on sealing surfaces and increase the life of the engine.

The improved apex seal strips of the invention are also usable singly or in combination, to prevent jamming when tilted, and to prevent leakage and poor sealing. For example, it may prove advantageous to use a pair of strips in a single groove, one strip 26 of the pair according to FIGURE 2 and the other strip 26a according to FIGURE 3. This combination would still further reduce the size of the gaps at the end faces over the gaps of either strip used singly.

FIG. 6 is a view similar to FIG. 1A, showing a seal strip constructed according to the invention and in a temporarily tilted position as may occur during operation. Seal member 26 is tilted in the radial plane about an axis normal to the side face of the seal, the amount of tilt being much exaggerated in the drawing for clarity of illustration. Seal member 26 has no dimension, such as the diagonals of its side face, which is greater than its maximum axial extent when in the normal untilted position, such maximum axial extent 40 being in the embodiment shown identical with the length of its sealing edge 34. Therefore, apex sealing means constructed according to the invention precludes the jamming of a seal strip between the end walls, and a temporarily tilted seal strip easily returns to its normal untilted position parallel to the rotor axis.

While I have described my invention in detail in its present preferred embodiment it will be obvious to those skilled in the art after understanding my invention that various changes and modifications may be made therein within departing from the spirit or scope thereof.

What is claimed is:

1. A rotary mechanism comprising an outer body having spaced end walls and a peripheral wall forming a cavity therebetween; said outer body having an axis along which said end walls are spaced; an inner body disposed within said outer body for rotation relative to said outer body; said inner body having a plurality of circumferentially-spaced apex seal means about the periphery for forming a plurality of working chambers between said bodies; each of said apex seal means:
   (a) being received in normally axial-parallel position within a single radially outwardly facing groove which extends from one inner-body end-face to the other,
   (b) having a plurality of surfaces shaped for sealing engagement with the respective adjacent surfaces of said outer body, including a radially outer edge which is in sealing engagement with the thereto adjacent inner surface of said peripheral wall,
   (c) and comprising a radially movable seal strip tiltable in a radial plane during operation of said mechanism and having a pair of axially-spaced end faces, said axial end faces being shaped so that if said seal strip is tilted in a radial plane during operation of said mechanism the greatest axial extent of said seal strip in a plane parallel to the axis of the outer body is no greater than in the normal untilted position, thereby assuring free tilting movement of said seal strip in said radial plane and free recovery from the resultant tilted position to normal position.

2. A rotary mechanism as recited in claim 1 and in which the side elevational profile of each axial end face of each apex seal strip is a convex circular arc extending radially from the radially inner edge to the radially outer edge of said strip; and in which each apex seal means includes a supplementary piece at each of its ends, each said supplementary piece having a concave circular arc face at one end congruent with and having sealing cooperation with said adjacent convex circular arc face of its associated apex seal strip, and having sealing engagement at its other end with the adjacent housing end wall.

3. A rotary mechanism as recited in claim 1 and in which the longest untilted axial extent of each seal strip occurs along a line parallel to its respective radially outer edge but displaced radially inwardly a distance equal to a fraction of its groove depth.

4. A rotary mechanism as recited in claim 1 and in which each apex seal strip forms part of a multi-part apex seal means structure seated within the respective apex seal groove, being positioned axially interiorly of other parts the axially outermost of which having axial end faces in sealing engagement with the outer body end walls.

5. A rotary mechanism as recited in claim 4 and in which the longest untilted axial extent of each seal strip occurs along its radially outer edge.

6. A rotary mechanism as recited in claim 4 and in which each axial end face of said seal strip has a side elevational profile such that all points thereon be within an arc of a circle whose center lies on its longest untilted axial extent, between the mid-point of said extent and its opposite end.

7. A rotary mechanism as recited in claim 4, and in which each apex seal means is provided with a pair of spring means seated in the respective groove, the first engaging the underside of the respective apex seal strip and the second for engaging the underside of the other parts of the respective apex seal means structure, for urging the entire structure to sealing engagement with the aforesaid peripheral wall.

References Cited by the Examiner

UNITED STATES PATENTS

| | | | |
|---|---|---|---|
| 1,280,306 | 10/18 | Rolaff | 230—152 |
| 1,495,526 | 5/24 | Phillips | 103—136 |
| 2,801,791 | 8/57 | Walter | 230—152 |
| 3,000,324 | 9/61 | Rosaen | 103—136 |
| 3,064,880 | 11/62 | Wankel et al. | 123—8 |

FOREIGN PATENTS

| | | |
|---|---|---|
| 568,792 | 7/58 | Belgium. |
| 468,773 | 11/26 | Germany. |

JOSEPH H. BRANSON, Jr., *Primary Examiner.*

LAURENCE V. EFNER, *Examiner.*